(No Model.)

M. H. HITCHCOCK.
CULTIVATOR.

No. 308,071. Patented Nov. 18, 1884.

Witnesses:
F. W. Pugsley
A. B. Smith

Inventor:
M. H. Hitchcock
per A. B. Smith
Attorney.

United States Patent Office.

MARK H. HITCHCOCK, OF POUGHKEEPSIE, NEW YORK.

CULTIVATOR.

SPECIFICATION forming part of Letters Patent No. 308,071, dated November 18, 1884.

Application filed February 2, 1884. (No model.)

*To all whom it may concern:*

Be it known that I, MARK H. HITCHCOCK, of the city of Poughkeepsie, county of Dutchess, and State of New York, have invented certain new and useful Improvements in Cultivators; and I do hereby declare the following to be a full and exact description of the invention, such as will enable others skilled in the art to make and use it, reference being had to the accompanying drawings, which form part of this specification.

My invention relates, mainly, to the production of an improved cultivator and tooth.

Figures 3, 4:
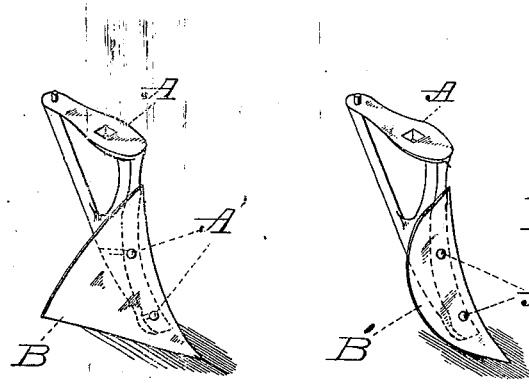

I am aware that many inventions have been made in this line, and yet the demand for a simple, durable, and light-draft cultivator has not been fully supplied. My object is to produce a light-draft cultivator that will cut and turn over the surface of the ground and throw the dirt inward or outward at the option of the farmer, and at the same time thoroughly cut and pulverize the surface of the ground. I use a uniform metallic tooth, interchangeable and reversible, constructed of metal, about eleven inches on one side by eight inches on each of the other sides, and curved so as to fit the like arc of the standards, and so attached by two bolts and nuts that the tooth may be changed to a right or left standard by reversing the direction of the long side, thus utilizing two sides as cutting-edges. This tooth and its application comprise the principal novelty of my invention. I use an ordinary V-shaped frame with guide or gage wheel in front and the ordinary brace or standard for carrying the teeth. My standards are, however, curved so as to present a beveled surface of the same arc as the tooth, inclining either right or left, so that the tooth when worn on one point and edge may be changed to opposite beveled standard and present to the ground a new edge and point. The shape of the tooth is nearly an isosceles triangle, and is bent so that its longest edge forms the arc of a circle whose radius is about the same length as its chord, the same bend extending across the width of the tooth. The handles are adjusted to any height by rods attached to each, and held by friction-clamps on the center bar of the cultivator. The sides may be made reversible or interchangeable. I attain a more perfect cutting of the surface of the ground and a more complete pulverization of the soil by my peculiarly-shaped tooth. Some of the teeth may have the outer corner off, as shown in Fig. 4.

In the drawings like letters indicate like parts.

Figure 1:
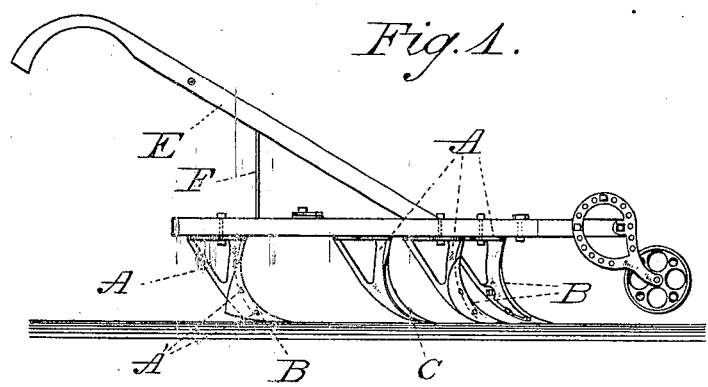
Figure 2:
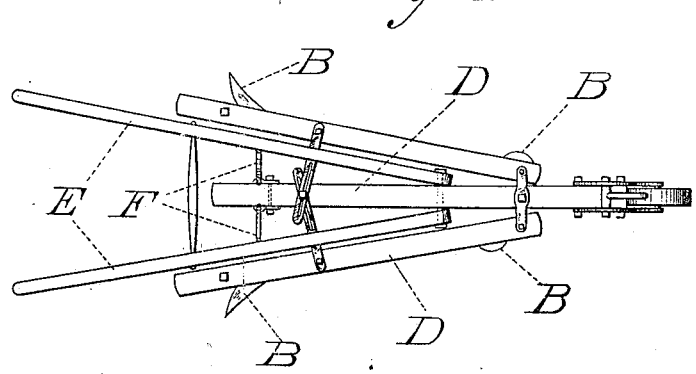
Figure 5:
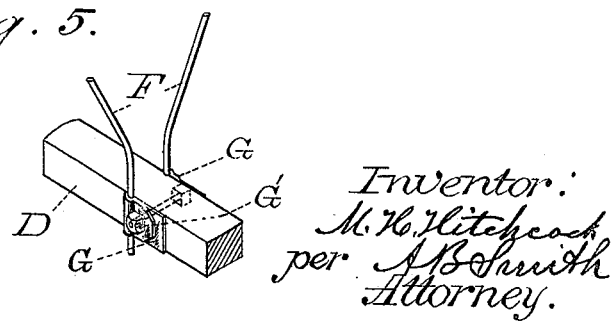

Figure 1 is a side view of the cultivator; Fig. 2, a top view; Fig. 3, the standard and tooth attached, and Fig. 4 a standard and the elliptical-shaped tooth. Fig. 5 shows the rods and adjusting-clamps.

A shows the standard; B, the triangular tooth; B', the elliptical tooth, and A' the bolts fastening the teeth to the standards. D shows the frame; E, the handles; F, the adjusting-rods; G, the friction-clamps, and G' the nut and bolt holding the friction-clamps.

Having thus described my invention and its construction and manner of operation, what I claim, and desire to obtain Letters Patent for, is—

The tooth B, as shown in Fig. 3, in combination with the standard A and the ordinary V-shaped cultivator-frame, as shown and described, and for the purpose set forth.

MARK H. HITCHCOCK.

Witnesses:
F. W. PUGSLEY,
A. B. SMITH,
K. J. LAWLOR.